Nov. 11, 1924.                                                 1,514,826
H. S. BERGEN
WEIGHING SCALE
Filed Feb. 18, 1920                         2 Sheets-Sheet 1

Witnesses.
C. E. Hilory

Inventor
Harry S. Bergen.
By George R. Frye
Attorney

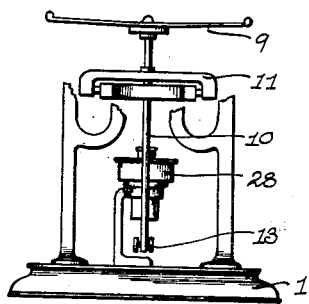
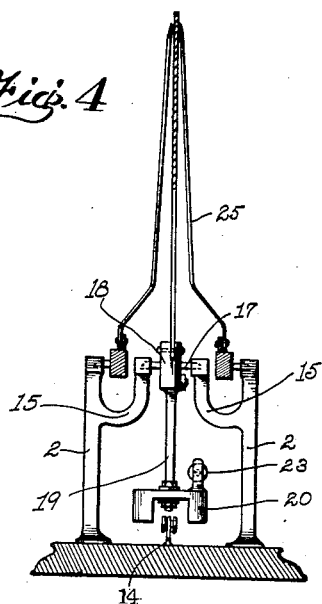
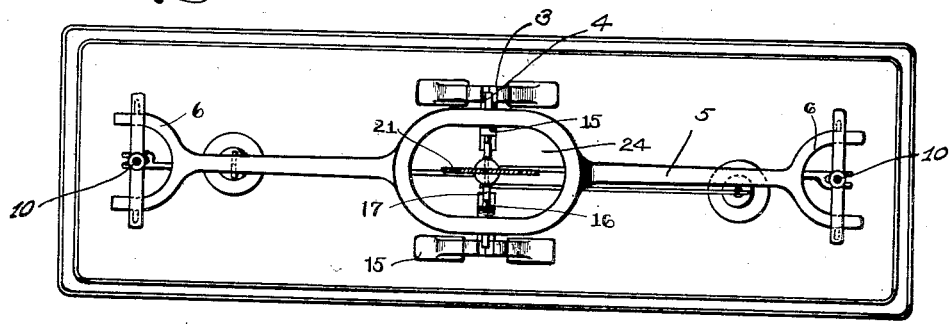

Patented Nov. 11, 1924.

1,514,826

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 18, 1920. Serial No. 359,552.

*To all whom it may concern:*

Be it known that I, HARRY S. BERGEN, a citizen of the United States, residing at Toledo, in the county of Lucas and State of Ohio, have invented certain new and useful Improvements in Weighing Scales, of which the following is a specification.

My invention relates to improvements in weighing scales, particularly scales having an index so connected to the weighing mechanism as to be moved thereby over a relatively stationary chart to indicate the weight of the load on the commodity-receiver of the scale. Such scales usually have a platform or base which is designed to be set upon a level surface, and any deviation of such surface from a horizontal plane necessitates leveling the scale base by means of adjusting screws or the like.

It is an object of this invention to so mount the chart that any movement of the weighing mechanism of the scale and consequent movement of the indicator due to the scale's being out of level will be compensated for by a corresponding movement of the chart.

Other objects and advantages will be apparent from the following description, in which reference is had to the accompanying drawings illustrating a preferred embodiment of my invention and in which similar reference numerals designate similar parts throughout the several views.

In the drawings:—

Figure 3 is an end elevation of a portion of the lever mechanism of the scale;

Figure 4 is a vertical sectional view taken substantially on the line 4—4 of Figure 2; and Figure 5 is a sectional plan view taken substantially on the line 5—5 of Figure 2.

Figure 1:
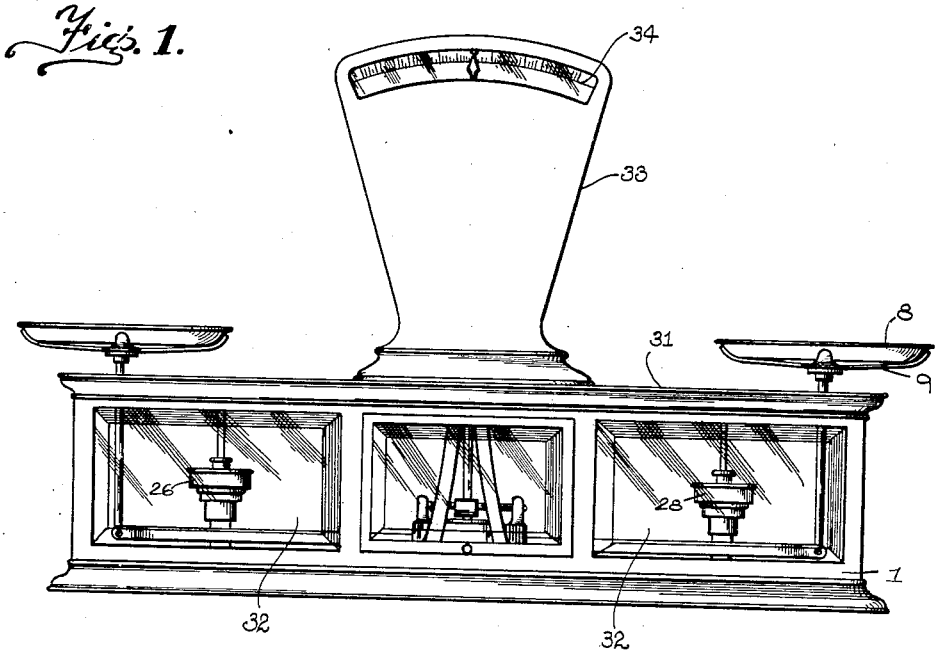
Figure 1 is a front elevation of a scale embodying my invention.
Figure 2:
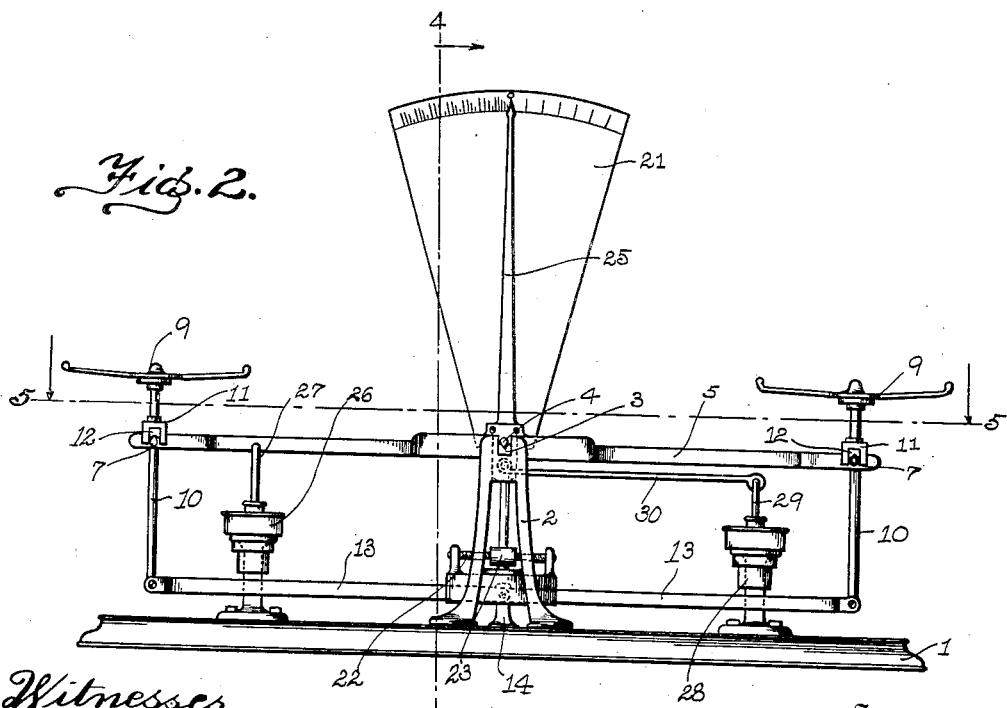
Figure 2 is a front elevation of the scale shown in Figure 1 with the housing removed.

For the sake of clearance of description I have shown my invention as applied to a scale of the "even-balance" type and my invention is particularly applicable thereto. It is to be understood, however, that the invention may be applied to scales of other types, and I contemplate using it wherever applicable.

Referring to the drawings in detail, the weighing mechanism of the scale is supported upon a base 1 near the center of which is secured a pair of fulcrum stands 2, the upper ends of the fulcrum stands being notched to receive grooved bearings 3 which are suitably secured in place therein.

Rockably supported upon the grooved bearings 3 are the aligned fulcrum pivots 4 of the main lever 5 of the scale. The main lever 5 is of the first class and the ends thereof are forked, as at 6, and carry upturned knife edge load pivots 7. The commodity-receiving pans 8 of the scale are supported by spiders 9 having downwardly-extending spider stems 10 which pass between the forks at the ends of the lever 5. Extending transversely of the lever 5 adjacent each end thereof is a bar 11, each of said bars being rigidly secured to one of the spider stems 10. The ends of the bars 11 are turned downwardly, as shown in Figure 3, and the downturned ends thereof are notched to receive inverted grooved bearings 12 which rests upon the upturned edges of the load pivots 7.

The lower ends of the spider stems 10 are pivoted to the ends of check links 13 which extend from their pivotal connections with the stems 10 toward each other and are pivoted to a short standard 14 secured at the center of the upper side of the base 1. The pivotal connection between the links 13 and the standards 14 lies in the same vertical plane with the axis of the fulcrum 4, and the distance between the pivots on each of the links is the same as the distance between the fulcrum 4 and the corresponding load pivot 7. Lines connecting the fulcrum and load pivots and the pivotal connections of the links 13 form a parallelogram and the links 13 therefore serve to maintain the stems 10 in vertical position without injuriously affecting the weighing operations of the scale.

It will be noted upon inspection of Figure 4 that an arm 15 branches from each of the fulcrum stands 2 some distance below the ..r end thereof and extends inwardly and upwardly, terminating in line with the upper ends of the fulcrum stands. The upper ends of the arms 15 are similar in construction to the upper ends of the standards 2, being notched to receive grooved bearings 16. Rockably supported in the grooved bearings 16 is the downturned knife edge pivot 17 of a pendulum 18 having a stem 19 and a heavy bob 20. A fan-shaped chart 21 is secured to the pendulum 18 to swing therewith and the bob 20 of the pendulum carries a threaded rod 22 upon which is mounted a movable weight 23. By turning the weight 23 upon the rod 22 the center of mass of the pendulum may be shifted and the position of the chart 21 thereby adjusted until its zero graduation is directly above the fulcrum of the main lever.

In order to provide room for properly mounting the pendulum 18 and the parts connected therewith, the central portion of the lever 5 is expanded and an oval opening 24 is formed therein. Mounted upon the lever 5 on each side of the opening 24 is an index hand 25 which extends upwardly at substantially right angles to the lever 5 and indicates the zero graduation on the chart 21 when the lever 5 is horizontal. Should the base 1 of the scale be thrown out of level the lever 5 will move to horizontal position and the pendulum 18 will at the same time swing until its center of mass is directly beneath the axis of its pivot 17. The axes of the fulcrum pivots of the lever 5 and the pivot 17 of the pendulum are in alignment so that the relative positions of the index 25 and the chart 21 will be the same as before the scale was thrown out of level.

Undue vibration of the lever 5 is prevented by provision of a dash pot 26 having a reciprocating plunger therein connected by means of a link 27 to the lever 5, and undue swinging of the pendulum 18 and chart 21 is provided against by means of a dash pot 28 having a plunger therein which is connected through the link 29 to an arm 30, the arm 30 being rigidly secured to the pendulum 18. The lever mechanism of the scale is protected by a box-like housing 31 having windows 32 in its sides to display the weighing mechanism. A substantially fan-shaped chart casing 33, the dimensions of which are great enough to allow limited swinging movement of the chart and which has arcuate windows 34 to display the chart graduations and the index hand, is suitably supported upon the housing 31.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, weighing mechanism, an indicator connected thereto, an upwardly-extending chart adapted to co-operate with said indicator, and gravity-controlled automatic means to position the said chart to correspond to the position of the weighing mechanism when the scale is out of level.

2. In a scale, in combination, weighing mechanism, an indicator connected thereto, a pivotally-mounted chart adapted to co-operate with said indicator, and a pendulum depending from said chart to automatically position the same to correspond to the position of the weighing mechanism when the scale is out of level.

3. In a scale, in combination, a lever, an upwardly-extending indicator hand connected thereto, a chart co-operating with said indicator, and a pendulum to automatically position said chart when the scale is out of level.

4. In a scale, in combination, an even-balance lever, an upstanding indicator fixed on said lever, a fan-shaped chart adapted to co-operate with said indicator, and means to position said chart to correspond with the position of said lever when the scale is out of level.

5. In a scale, in combination, a lever, an indicator connected to said lever, a pendulum, and a chart fixed to said pendulum and adapted to co-operate with said indicator said pendulum being pivoted on an axis coinciding with the pivotal axis of the lever fulcrum.

6. In a scale, in combination, a lever, an upstanding indicator hand fixed upon said lever, an upright pendulated chart pivoted on an axis coinciding with the pivotal axis of the lever fulcrum and a pendulum fixed to said chart.

7. In a scale, in combination, a lever fulcrumed at its center, an upstanding indicator hand fixed upon said lever, an upright chart pivoted on an axis coinciding with the pivotal axis of the lever fulcrum and a pendulum fixed to said chart.

8. In a scale, in combination, a lever having a central opening therein, a pivoted chart extending through said opening and a pendulum fixed to said chart.

9. In a scale, in combination, a pair of fulcrum stands, a lever fulcrumed thereon, said lever having an opening therein, branches on said stands extending into said opening, a chart pivoted upon said branches and a pendulum fixed to said chart.

10. In a scale, in combination, weighing mechanism, an indicator connected thereto, a pivoted chart co-operating with said indicator, a pendulum fixed to said chart and means for damping swinging movement of said chart and pendulum.

11. In a scale, in combination, a lever, an indicator connected thereto, a pivoted chart co-operating with said indicator, a pendulum fixed to said chart, a dash pot retarding device for damping the movement of said lever, and a dash pot retarding device for damping the movement of said chart and pendulum.

12. In a scale, in combination, a pivoted chart, a horizontally-extending arm fixed thereto, and a dash pot retarding device connected to said arm.

HARRY S. BERGEN.

Witnesses:
C. E. WILCOX,
C. O. MARSHALL.